United States Patent
Imbimbo et al.

(10) Patent No.: US 7,843,902 B2
(45) Date of Patent: Nov. 30, 2010

(54) INTERCEPTION OF MULTIMEDIA SERVICES

(75) Inventors: Amedeo Imbimbo, Caivano (IT); Maurizio Iov'eno, Mercato San Severino (IT)

(73) Assignee: Relefonaktiebolaget L M Ericsson, Stockholm (SE)

( * ) Notice: Subject to any disclaimer, the term of this patent is extended or adjusted under 35 U.S.C. 154(b) by 377 days.

(21) Appl. No.: 11/917,917

(22) PCT Filed: Jul. 1, 2005

(86) PCT No.: PCT/SE2005/001102

§ 371 (c)(1),
(2), (4) Date: Dec. 18, 2007

(87) PCT Pub. No.: WO2007/004938

PCT Pub. Date: Jan. 11, 2007

(65) Prior Publication Data

US 2010/0039946 A1     Feb. 18, 2010

(51) Int. Cl.
    H04L 12/66      (2006.01)
(52) U.S. Cl. ........................ 370/352; 713/151
(58) Field of Classification Search ........................ None
    See application file for complete search history.

(56) References Cited

U.S. PATENT DOCUMENTS

| | | | |
|---|---|---|---|
| 6,754,834 B2 * | 6/2004 | Miettinen et al. | 726/3 |
| 2004/0157629 A1 * | 8/2004 | Kallio et al. | 455/466 |
| 2004/0228362 A1 * | 11/2004 | Maki et al. | 370/467 |
| 2007/0041558 A1 * | 2/2007 | Parayil et al. | 379/219 |

FOREIGN PATENT DOCUMENTS

| WO | WO 2005/025133 | 3/2005 |
|---|---|---|
| WO | WO 2005/025257 A1 | 3/2005 |

OTHER PUBLICATIONS

3GPP TS 33.108 V6.0.0 (Dec. 2002) Technical Specification 3rd Generation Partnership Project;Technical Specification Group Services and System Aspects; 3G Security; Handover interface for Lawful Interception (Release 6).

3GPP TS 33.107 V7.0.0 (Jun. 2005) Technical Specification 3rd Generation Partnership Project;Technical Specification Group Services and System Aspects; 3G security; Lawful interception architecture and functions (Release 7).

(Continued)

*Primary Examiner*—Duc C Ho

(57) ABSTRACT

A method in a telecommunication system for monitoring a communication by a Law Enforcement Monitoring Facility (LEMF). The LEMF sends a request for monitoring of a first party to a Call Session Control Function (CSCF) in a service domain of the telecommunication system. When the CSCF detects a SIP session event due to a setup of a media-flow connection between the monitored party and a second party, the CSCF sends Interception Related Information (IRI) toward the LEMF, and sends a resource setup message to a Multimedia Resource Function (MRF), also in the service domain. A Gateway GPRS Support Node (GGSN) routes the Communication Content (CC) to the MRF. The MRF copies the CC and routes one copy back to the GGSN and routes the other copy to the LEMF via a Delivery Function utilizing a SIP session with the LEMF.

10 Claims, 5 Drawing Sheets

OTHER PUBLICATIONS

3GPP TS 23.228 V5.0.0 (Apr. 2001) 3rd Generation Partnership Project; Technical Specification Group Services and System Aspects; IP Multimedia (IM) Subsystem—Stage 2 (Release 5).

3GPP. Universal Mobile Telecommunications System (UMTS); 3G Security; Handover Interface for Lawful Interception (LI) (3GPP TS 33.108 version 6.9.0 Release 6). ETSI TS 133.108 V6.9.0 (Jun. 2005). Sophia Antipolis Cedex, France.

3GPP. Universal Mobile Telecommunications System (UMTS); 3G Security; Lawful Interception Architecture and Functions (3GPP TS 33.107 version 6.5.0 Release 6). ETSI TS 133.107 V6.5.0 (Jun. 2005). Sophia Antipolis Cedex, France.

* cited by examiner

INTERCEPTION OF MULTIMEDIA SERVICES

TECHNICAL FIELD OF THE INVENTION

The present invention relates to methods and arrangements for lawful interception of multimedia services in a telecommunication system comprising a service domain handling session control and a bearer domain handling media flow.

DESCRIPTION OF RELATED ART

IP Multimedia Subsystem lawful interception is disclosed in 3GPP TS 33.107 and TS 33.108. In the document, provision of Interception Related Information IRI for SIP messages handled by a Call Session Control Function CSCF is disclosed. Interception of Content of Communication CC hereby must be done at GPRS Support Node GSN under a separate LI activation and invocation. IRI for SIP signaling will be obtained by interception in the CSCF, while CC will be obtained by interception in the GSN, based on a standard protocol different from SIP. The solution for CC interception for multimedia services defined in the current specific standards has some drawbacks. The 3GPP standards propose to intercept the CC in the GSN, but it is still not fully specified how the correlation between the IRI and the CC shall be implemented. Correlation techniques between multi-media IRI and CC are under discussion in 3GPP SA3-LI. At the moment 3GPP is only defining possible container parameters to carry correlation information but still the complete solution is considered and all the real correlation between IRI and CC for multimedia services is left to post-processing activities at the LEMF, which has some drawbacks from Law Enforcement Agencies point of view.

Moreover, in case of roaming, it can happen that the SGSN handling the CC is outside the domain of the operator running the multimedia service: in this case, LEA cannot get any CC from the SGSN and it would be difficult or even impossible to get CC from the multi-media domain. This would have as result that LEA would not be able to get CC, neither from the SGSN operator nor from the multimedia service operator.

IMS is intended to be independent on the core network (PLNM, PSTN, IP) and on the access network (i.e. fixed narrow- and broad-band access, mobile UE, LAN, WLAN); nevertheless, given that there is no generic LI solution for CC interception in the multimedia domain and given the need to satisfy legal requirements to intercept the CC for multimedia, different solutions are under study by different standardization committees, all of them being based on the specific access technology used to bear the multimedia content. As example, ETSI-TISPAN is focusing for Next Generation Networks (NGN) on CC interception in a Gateway, depending on the specific access technology. This would be already a different solution than the one adopted in UMTS networks when the bearer is located in the Packet Switching domain. This seems against the access independent principle underlying the IMS concept and implies higher costs for the operators, being forced to spread LI functions in several nodes.

From Law Enforcement Agency perspective, the existing technology allows to provide the LEMF with SIP signaling and bearer streams intercepted on access level. This requires a complete post processing to recover the real service being used by the target subscriber, which is not always simple and will imply upgrades of the post-processing each time that a new multimedia service will be introduced.

In WO 2005/025133 monitoring of a media session between two subscribers is disclosed. The bi-directional media session hereby passes a gateway in the service domain. The monitoring takes place by assigning an extra port to the gateway, from which port a copy of the media session is lead to a monitoring function. A prerequisite for the monitoring according to the international application is that the media session is intended to pass through the service domain even if no monitoring takes place. In WO 2005/025133 still the problem remains how to avoid post processing of Interception Related Information and Content of Communication, for correlation purposes.

FIG. 1 discloses an existing solution for monitoring of Interception Related information IRI and Content of Communication CC for the same target according to prior art. The different parts used for interception belong to prior art and are disclosed in current Lawful Interception standards (see 3GPP TS 33.108 and 3GPP TS 33.107—Release 6 and Release 7). A Law Enforcement Monitoring Facility LEMF is connected to three Mediation Functions respectively for ADMF, DF2, DF3 i.e. an Administration Function ADMF and two Delivery Functions DF2 and DF3. The Administration Function and the Delivery Functions are each one connected to the LEMF via standardized handover interfaces HI1-HI3, and connected to a telecommunication system via the interfaces X1-X3. The ADMF is connected via the interfaces HI1/X1 while DF2 is connected via HI2/X2 and DF3 is connected via HI3/X3. The messages sent from LEMF to ADMF via HI1 and from the ADMF to the network via the X1 interface comprise identities of a target that is to be monitored. The Delivery Function DF2 receives Intercept Related Information IRI from the network via the X2 interface, and DF2 is used to distribute the IRI to relevant Law Enforcement Agencies via the HI2 interface. The Delivery Function DF3 receives Content of Communication CC, i.e. speech and data. In Circuit Switching, DF3 is responsible for call control signaling and bearer transport for an intercepted product. Intercept Related Information IRI, received by DF2 is triggered by Events that in Circuit Switching domain are either call related or non-call related. In Packet Switching domain the events are session related or session unrelated. Two Universal Mobile Telecommunications System networks, UMTS NW1 and UMTS NW2, are disclosed in a Bearer Domain. UMTS NW1 comprises a Gateway GPRS Support Node GGSN via which node a mobile subscriber A communicates. UMTS NW2 comprises a second mobile subscriber B. In this example subscriber A, having a SIP capable terminal, will ask to setup a SIP call to B. According to known technique the GGSN will hereby contact a CSCF located in a Service Domain. The CSCF extracts the SIP related information, detects that there is a request to setup a SIP call to B and acts accordingly. The two subscribers A and B then communicate through a media flow connection via an IP Network in Bearer Domain and Content of Communication CC is sent between A and B. The ADMF is connected to the Call Session Control Function CSCF. A first activation signal Activation 1 is sent from the ADMF to the CSCF. The first activation signal requests monitoring of Interception Related Information IRI related to subscriber A. A separate second activation signal Activation 2 is sent from the ADMF to the GGSN. The second activation signal requests monitoring of Content of Communication related to the subscriber A. In this prior art example, upon receiving specified activities related to the monitored subscriber, IRI will be sent from CSCF to LEMF by sending a copy of the SIP message to DF2 and CC will be sent from GGSN to LEMF by sending a copy of packets, with an additional standard LI header, to DF3/MF. A complete post processing is required to recover the real service being used by the target subscriber, which is not always simple and will imply upgrades of the post-processing each time that a new multimedia service will be introduced.

SUMMARY OF THE INVENTION

The present invention relates to a problem how to find a generic solution to intercept media flow i.e. Content of Communication in the service domain independently of which access network that provides the media flow from the bearer domain.

A further problem is how to implement correlation between Interception Related Information and Content of Communication without the need of post processing to recover the real service being used by a target subscriber from which monitored media flow arrives.

The problems are solved by the invention by activating interception of Content of Communication in the service domain for a specific target. Upon detection of a SIP session related to the target, a new specific SIP session is established between the IMS nodes and the LEMF, which acts as a SIP client, and used for transportation of media flow to a Monitoring Facility.

The solution more in detail is a method for monitoring in a telecommunication system, which system comprises a service domain that handles session control and a bearer domain used for transportation of media flow. A request for monitoring of a first party A is received by a Call Session Control Function CSCF in the service domain. The method comprises the following further steps:

- A SIP session event is detected by the Call Session Control Function CSCF due to a set-up of a media-flow connection between the monitored party A and a second party B.
- A resource set-up message SIP1 is sent via an interface Mr from the Call Session Control Function CSCF to a Multimedia Resource Function MRF in the service domain.
- A SIP transaction is established between the Multimedia Resource Function MRF and a third Delivery Function DF3.
- A SIP session is established between the third Delivery Function DF3 and a Law Enforcement Monitoring Facility LEMF.

A purpose with the invention is to introduce a solution for the CC interception that is general for any kind of access and core networks.

An advantage of the invention is that the invention proposes a new generic Lawful Interception LI solution for Content of Communication CC interception in case of multimedia services based on a new IMS based LI reference model that can be used independently on the core network (i.e. PLMN, PSTN, IP) and on the access network (i.e. fixed narrow- and broad-band access, mobile UE, LAN, WLAN).

Another advantage of the invention is that operators running multimedia service would satisfy their LI obligations in a very simple way, covering all roaming scenarios, in a way completely independent by the access network used as bearer.

An advantage for agencies would be that the new proposed CC delivery mechanism easily can be deployed to the lawful interception monitoring facility LEMF, as they should act as SIP client and the application SW providing SIP capability is widely diffused.

Yet another advantage for the agencies is that by using the invention, the law enforcement agency having a law enforcement monitoring facility LEMF with SIP capability would be able to have interception of multimedia services without any need to post-process CC coming from a GPRS support node, which in certain roaming scenarios could be not available at LEMF. Moreover, LEMF would get the exact copy of the service being provided to the LI target.

The invention will now be described more in detail with the aid of preferred embodiments in connection with the enclosed drawings.

DETAILED DESCRIPTION OF EMBODIMENTS

Figure 2:
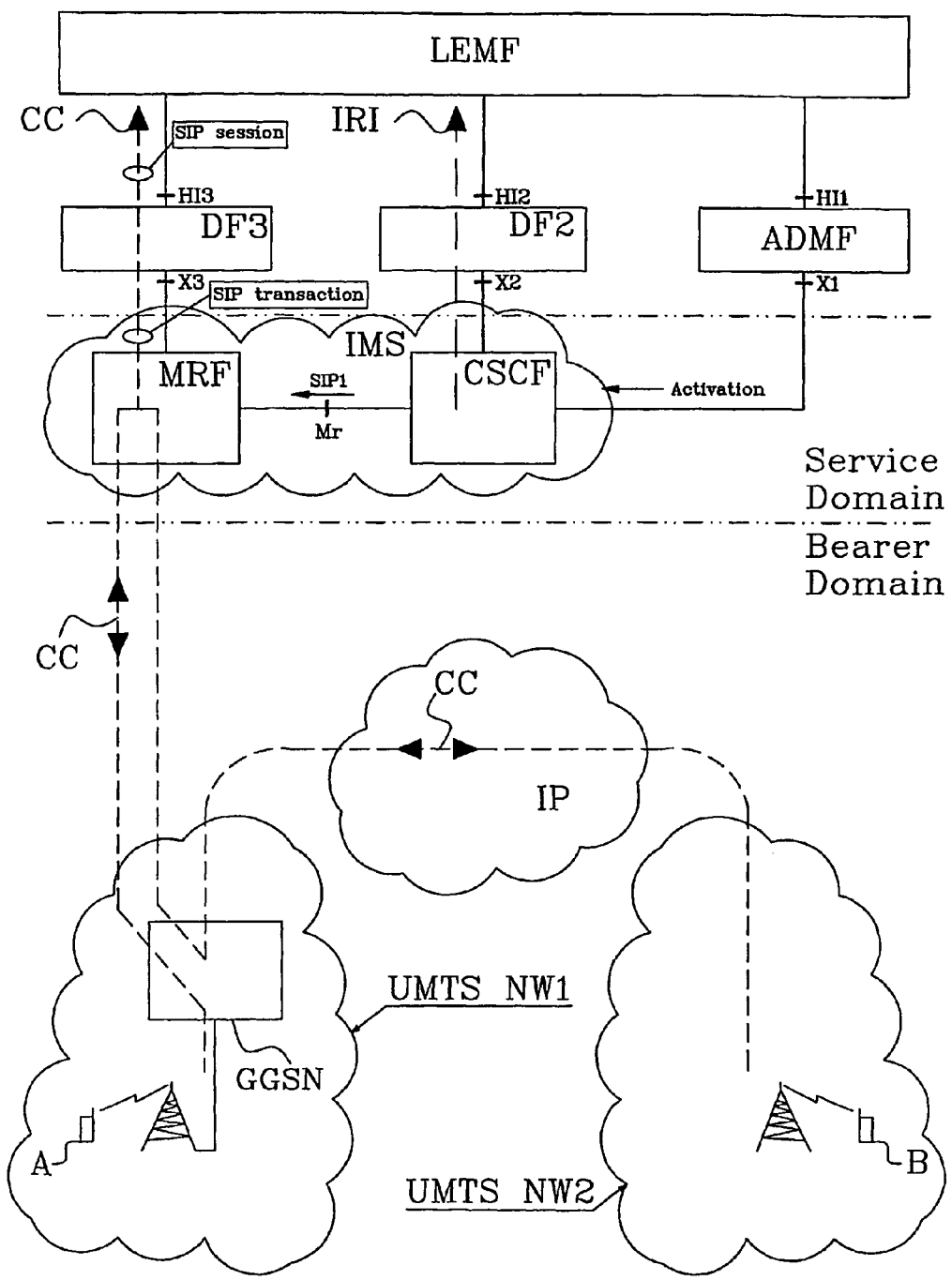
FIG. 2 discloses a block schematic illustration of an IMS network active in service domain and access networks active in bearer domain. Interception related information and content of communication related to a target is intercepted according to the invention.

FIG. 2 discloses a telecommunication system comprising a service domain and a bearer domain. An IP Multimedia Subsystem IMS composes the service domain. An IP network and two access networks, UMTS NW1 and UMTS NW2, compose the bearer domain. Entities related to IMS are Call Session Control Function CSCF, Multimedia Resource Function MRF, etc. as defined in the stage 2 of the IM subsystem 3GPP TS 23.228 "IP multimedia subsystem; Stage 2, rel-6". Among other things the CSCF handles the session states in the network and is the contact point within an operator's network for all IMS connections destined to a subscriber of that network operator, or a roaming subscriber currently located within that network operator's service area. Further definitions of the CSCF can be found in TS 23.228. The MRF may be used for services such as multiparty sessions. Among other things the MRF controls media stream resources and mix incoming media streams. Further definitions of the MRF can be found in TS 23.228 (see e.g. 5.16.2.2.2). The CSCF communicates with the MRF via an interface Mr to set up resources for services such as announcements, conference calling and transcoding. The protocol used in IMS is the Session Initiated Protocol SIP. SIP is an application layer control (signaling) protocol for creating, modifying, and terminating sessions with one or more participants. These sessions include Internet telephone calls, multimedia distribution, and multimedia conferences. Further definitions of the SIP can be found in IETF RFC 3261: "SIP: Session Initiated Protocol".

The GGSN supports the edge routing functions of a GPRS network. The GGSN provides IP connectivity between mobile users and multimedia messaging. UMTS NW1 comprises a mobile subscriber A, also called a first party, and UMTS NW2 comprises a mobile subscriber B, also called a second party.

A Law Enforcement Monitoring Facility LEMF is connected to three Mediation Functions respectively for ADMF, DF2, DF3 i.e. an Administration Function ADMF and two Delivery Functions, a so-called second Delivery Function DF2 and a third Delivery Function DF3. The Administration Function and the Delivery Functions are each one connected to the LEMF via standardized handover interfaces HI1-HI3, so-called first HI1, second HI2 and third HI3 handover interfaces, and connected to IMS via the interfaces X1-X3. The ADMF is connected via the interfaces HI1/X1 while DF2 is connected via HI2/X2 and DF3 is connected via HI3/X3. The messages sent from LEMF to ADMF via HI1 and from the ADMF to the IMS via the X1 interface comprise identities of a target that is to be monitored. The Delivery Function DF2 receives Intercept Related Information IRI from the IMS via the X2 interface, and DF2 is used to distribute the IRI to relevant Law Enforcement Agencies via the HI2 interface. The Delivery Function DF3 receives Content of Communication CC, i.e. the payload.

A first embodiment of the invention will now be explained more in detail. The embodiment will show a method of interception of IRI and CC for the target to be monitored, i.e. a subscriber A, without need of post-processing capabilities in the LEMF. The method comprises the following steps:

The Law Enforcement Monitoring Facility LEMF sends via the HI1 interface, a request to the Administration Function ADMF to activate interception for both IRI and CC of the first mobile subscriber A in case a SIP session event involving the subscriber A is detected by the CSCF.

Figure 1:
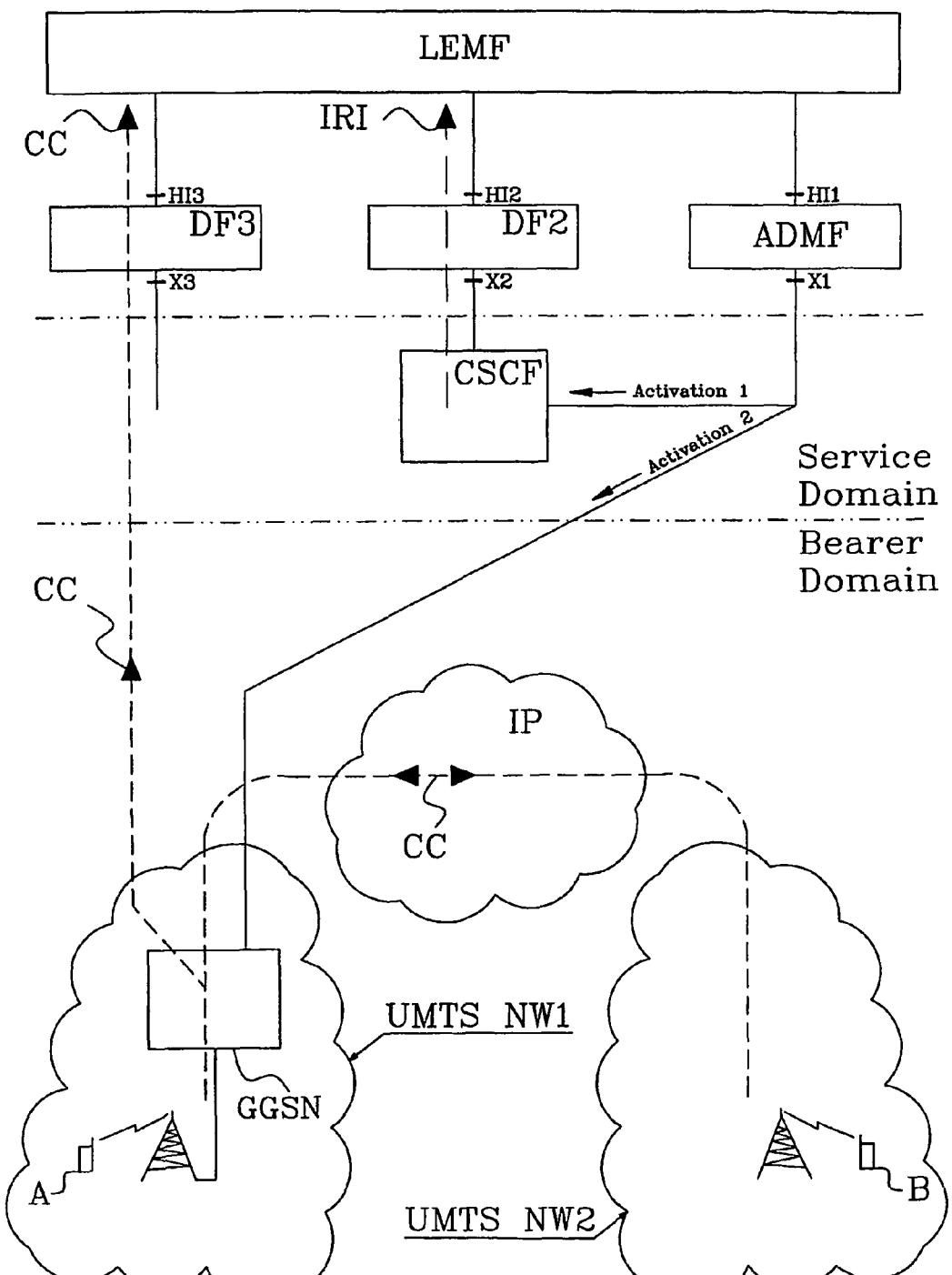
FIG. 1 discloses a block schematic illustration of an IMS network active in service domain and access networks active in bearer domain. Interception related information and content of communication related to a target is intercepted according to prior art.

The ADMF forwards a target identity of the mobile subscriber A to the Call Session Control Function CSCF. This corresponds to the reference "Activation" in FIG. 1.

The Call Session Control Function CSCF detects a SIP session event for the target subscriber. The event in this case is the set-up of a media-flow connection between the subscriber A and the second subscriber B.

The CSCF sends IRI to the DF2/MF over the X2 interface. SIP signaling is hereby reported as IRI to the LEMF according to existing mechanisms, i.e. when the CSCF detects a SIP message involving a target subscriber, a copy of the message is created and sent by the CSCF to DF2, which in turn sent it on the HI2 as IRI-REPORT.

A media-flow, i.e. Content of Communication CC, connection is set-up between the subscriber A and the second subscriber B via the IP network according to the existing mechanism specified for the bearer domain.

A resource set-up message SIP1 is sent via the Mr interface from the Call Session Control Function CSCF to a Multimedia Resource Function MRF. For the lawful intercept purposes, with Mr the CSCF communicates with the MRF to invite the Delivery Function DF3 in a group session, by using the MEF capability to establish a proper conference, which involves the target user i.e. subscriber A, the other party he is communicating with, i.e. subscriber B and the DF3 party, i.e. the LEMF.

The media-flow CC is re-routed from bearer domain, to pass also the Multimedia Resource Function MRF. This re-routing is well described in 3GPP TS 23.228, section 5.16.2.2.2.

A SIP transaction is established between the Multimedia Resource Function MRF and the third Delivery function DF3. A SIP session is established between the third Delivery Function DF3 and the Law Enforcement Monitoring Facility LEMF. The parties A and B and DF3 are involved in the same session and only a new "call leg" is established towards the DF3 while a new session is established towards the LEMF. The signals of both parties A and B of the configuration to be intercepted are delivered separately to the LEMF. The delivery function DF3 has no impact on the connection between the subscribers. Information that needs to be transferred from MRF to DF3 in order to perform its functionality is: Target identity (URI), correlation number (IRI<->CC) and Possible other information available in the nodes and required by the standards, as in already existing technology.

A copy of the media-flow CC between the subscriber A and the second subscriber B is delivered from the Multimedia Resource Function MRF to the Law Enforcement Monitoring Facility LEMF via the SIP transaction/session.

When both IRI and CC have been received by the LEMF, correlation of HI3 information to HI2 information takes place. In SIP, a generic protocol header field shall be used to carry correlation information. The principle is very similar to the one used for circuit switch call interception, for which it is used the supplementary service user-to-user signaling 1 (UUS1) to carry correlation of HI3 information. Similarly to the UUS1, that is a generic service and not specific for lawful intercept, SIP shall provide a generic protocol mean to carry this information. In the prior art, different nodes in different domains handle IRI and CC and it might be difficult to define a correlation number common to both domains. By the invention, IRI and CC are handled by entities in the same domain and correlation number can be based on session id or whatever identity used inside the domain itself. A correlation number common to both domains will be sent as a parameter on both the handover interfaces HI2 and HI3. The LEMF will hereby by able to implement correlation between the IRI and the CC without any need to have post-processing capabilities The bearer capability and Quality of Service used to provide the CC to the LEMF shall be the same capability offered by the core network when providing IMS services; this type guarantees that the information is passed transparently to the LEMF.

The CC communication channel shall be a one-way connection, from the operator's (NO/AN/SP) IIF to LEMF, the opposite direction is not switched through in the switching node of the target.

To conceal the fact that monitoring is going on, which monitoring might be detected by e.g. unauthorized persons due to the re-routing of the media flow in connection with the monitoring, also non-monitored calls may always be re-routed. This re-routing via the Multimedia Resource Function MRF will be done according to 3GPP TS 23.228 for all Media flow transportation multimedia services, requiring MRF capabilities.

Figure 3:
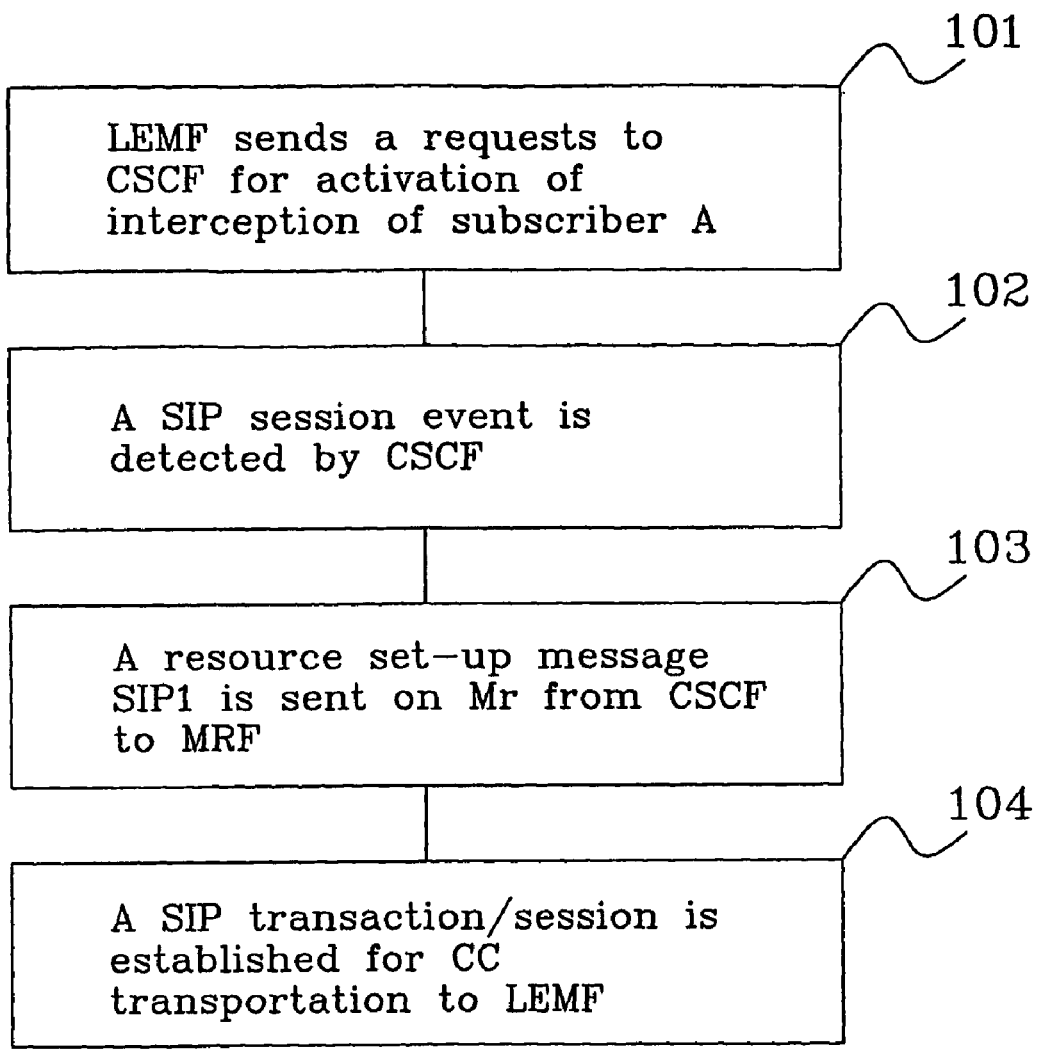
FIG. 3 discloses a flow chart illustrating some essential method steps of the invention.

FIG. 3 discloses a flowchart in which some essential steps are shown. The flowchart is to be read together with FIG. 2. The flowchart comprises the following steps:

The Law Enforcement Monitoring Facility LEMF sends a request to the Call Session Control Function CSCF to activate interception of the first mobile subscriber A. This step is disclosed in FIG. 3 by a block 101.

The Call Session Control Function detects a SIP session event. The event is set-up of a media-flow connection between the subscribers A and B. This step is disclosed in FIG. 3 by a block 102.

A resource set-up message SIP1 is sent via the Mr interface from the Call Session Control Function CSCF to a Multimedia Resource Function MRF. This step is disclosed in FIG. 3 by a block 103.

A SIP transaction/session is established between the Multimedia Resource Function MRF and the Law Enforcement Monitoring Facility LEMF via DF3 over the handover interface HI3. This step is disclosed in FIG. 3 by a block 104.

Figure 4:
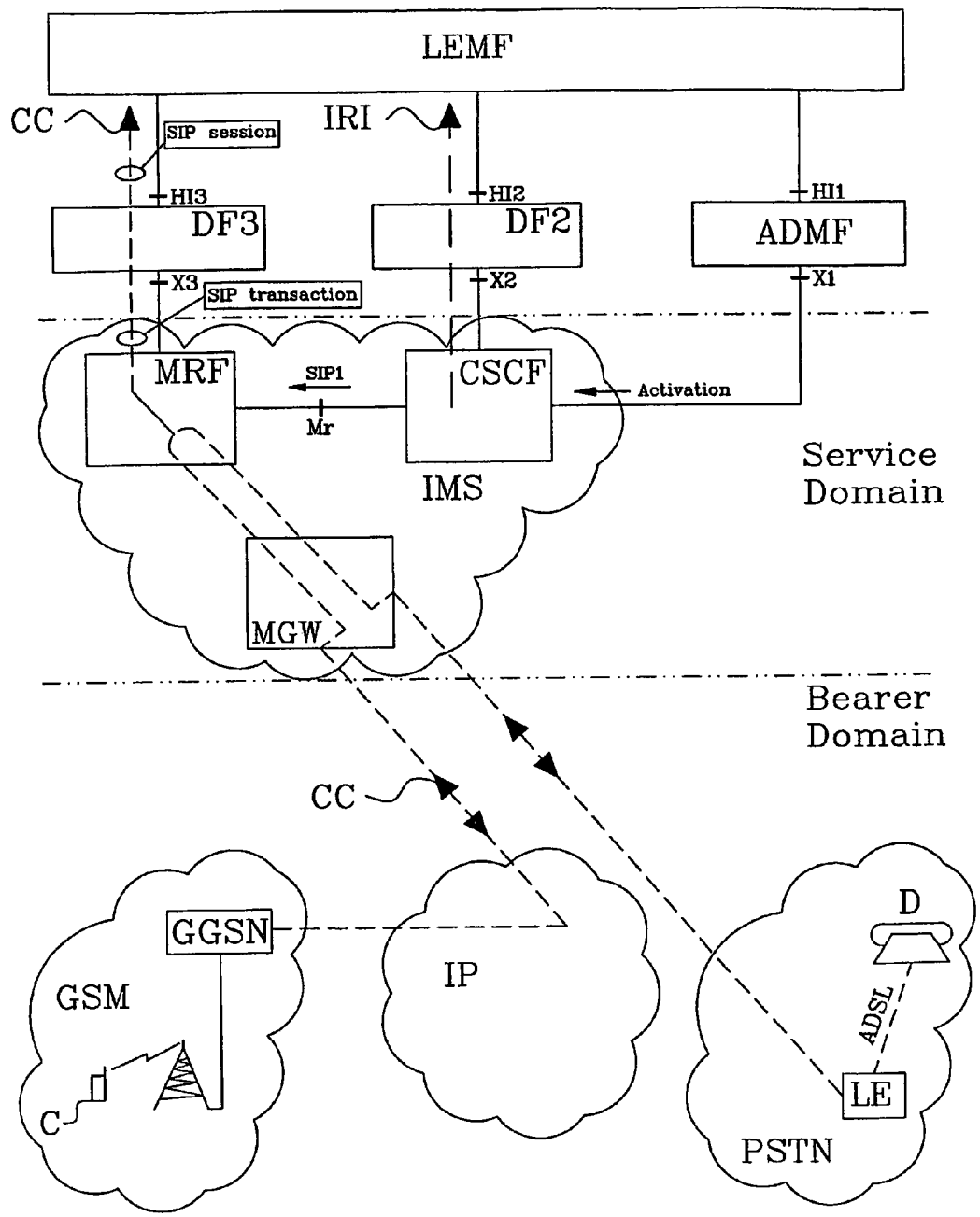
FIG. 4 discloses a block schematic illustration of an IMS network active in service domain and access networks active in bearer domain. Interception related information and content of communication related to a target is intercepted according to the invention. The Content of Communication is VoIP based and passes the service domain prior to the activation of interception.

FIG. 4 discloses a second embodiment of the invention. The second embodiment relates to Voice over IP VoIP. Like in the first embodiment an IP Multimedia Subsystem IMS composes the service domain. A media gateway MGW is shown in the service domain. A GSM network, an IP network and a PSTN network compose the bearer domain in this example. A mobile subscriber A in the GSM network is communicating with a fixed subscriber B in the PSTN network. The B subscriber hereby communicates through a Local Exchange LE via an Asymmetrical Digital Subscriber Line ADSL. In VoIP the Content of Communication CC passes an IP network and the media gateway in the service domain. Unlike in the first embodiment, in this embodiment the media-flow CC is re-routed from service domain, from the MGW, to pass also the Multimedia Resource Function MRF when interception is requested. The method according to the second embodiment comprises the following steps:

The Law Enforcement Monitoring Facility LEMF sends via the HI1 interface, a request to the Administration Function ADMF to activate interception of the first mobile subscriber C in case of a SIP session event involving the subscriber C is detected by the CSCF.

The ADMF forwards a target identity of the mobile subscriber C to the Call Session Control Function CSCF. This corresponds to the reference "Activation" in FIG. 4.

The Call Session Control Function detects a SIP session event.

A resource set-up message SIP1 is sent via the Mr interface from the Call Session Control Function CSCF to a Multimedia Resource Function MRF in order to establish a proper conference, which involves the target user subscriber C, the other party he is communicating with, i.e. subscriber D and the DF3 party, i.e. the LEMF.

The media-flow CC is re-routed from the media gateway MGW in service domain to pass also the Multimedia Resource Function MRF.

A SIP transaction/session is established between the Multimedia Resource Function MRF and the Law Enforcement Monitoring Facility LEMF via DF3 over the handover interface HI3.

A copy of the media-flow CC between subscriber C and the subscriber D is delivered from the Multimedia Resource Function MRF to the Law Enforcement Monitoring Facility LEMF via the SIP transaction/session.

Figure 5:
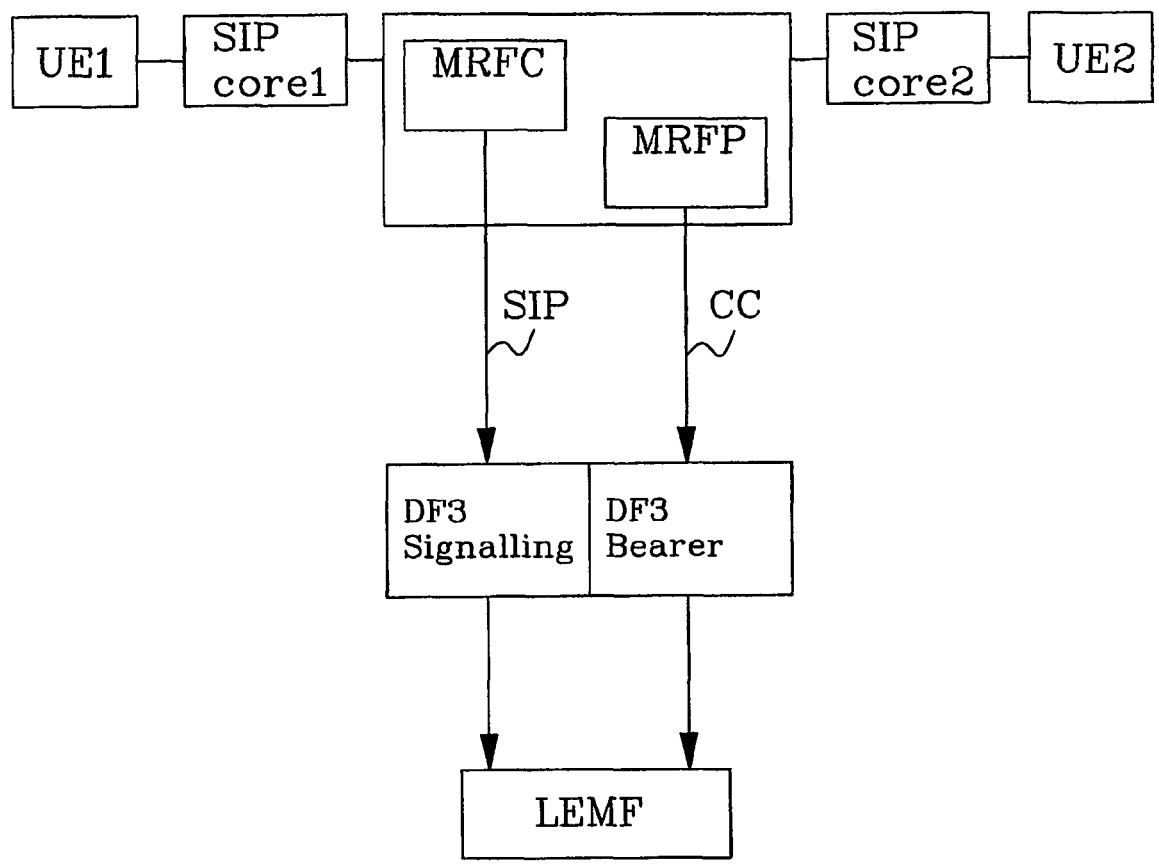
FIG. 5 discloses in a block schematic illustration, delivering of Content of Communication.

FIG. 5 shows the method for the delivering of Content of Communication CC. The method shall be a bridged/T-connection. SIP core in the figure consist of P- I- and S-CSCF nodes as defined in the standards. The figure illustrates the case of a multimedia session involving two parties UE1 and UE2. The signals of both parties of the configuration to be intercepted are delivered separately to the Law Enforcement Monitoring Facility LEMF. The delivery function has no impact on the connection between the parties.

The Multimedia Resource Function Processor MRFP handles the mixing of incoming media streams. The following information needs to be transferred from a Multimedia Resource Function Controller MRFC to the third Delivery Function DF3 in order to allow the DF3 to perform its functionality:

target identity (URI)
correlation number (IRI<->CC)

Possible other information available in the nodes and required by the standards, as in already existing technology.

The media flow could involve also a different entity than "B" subscriber, e.g. a media server. The invention is in other words not limited to the above described and in the drawings shown embodiments but can be modified within the scope of the enclosed claims.

The invention claimed is:

1. A method in a telecommunication system for monitoring a communication when requested by a Law Enforcement Monitoring Facility (LEMF), the method comprising the steps of:
   detecting by a Call Session Control Function (CSCF) in a service domain of the telecommunication system, a Session Initiation Protocol (SIP) session event due to a setup of a media-flow connection between a monitored party and a second party;
   sending Interception Related Information (IRI) from the CSCF toward the LEMF;
   sending a resource setup message from the CSCF to a Multimedia Resource Function (MRF), also in the service domain;
   receiving by the MRF, Communication Content (CC) from a media bearer node in a bearer domain of the telecommunication system, the CC being sent on the media-flow connection between the monitored party and the second party;
   copying the CC by the MRF; and
   routing a first copy of the CC from the MRF back to the media bearer node and routing a second copy of the CC from the MRF to the LEMF via a Delivery Function, wherein the Delivery Function is modified to establish a SIP session between the Delivery Function and the LEMF for delivery of the CC.

2. The method as recited in claim 1, wherein the SIP session provides a one-way connection for delivery of the CC to the LEMF.

3. The method as recited in claim 1, wherein the step of receiving the CC by the MRF includes receiving the CC from the media bearer node via a media gateway in the service domain.

4. The method as recited in claim 1, wherein:
   the step of sending IRI from the CSCF toward the LEMF includes sending IRI correlation information from the CSCF toward the LEMF; and
   the step of routing a second copy of the CC from the MRF to the LEMF includes sending CC correlation information in a SIP header as a correlation number that is common for both IRI and CC.

5. The method as recited in claim 4, further comprising correlating the IRI and the CC in the LEMF without any post processing.

6. An arrangement in a telecommunication system for monitoring a communication when requested by a Law Enforcement Monitoring Facility (LEMF), the arrangement comprising:
   a Call Session Control Function (CSCF) in a service domain of the telecommunication system;
   a Multimedia Resource Function (MRF) in the service domain of the telecommunication system; and
   a Delivery Function in the service domain of the telecommunication system;
   wherein the CSCF includes:

first communication means for detecting a Session Initiation Protocol (SIP) session event due to a setup of a media-flow connection between a monitored party and a second party;

second communication means for sending Interception Related Information (IRI) toward the LEMF; and third communication means for sending a resource setup message to the MRF;

wherein the MRF includes:

communication means for receiving Communication Content (CC) from a media bearer node in a bearer domain of the telecommunication system, the CC being sent on the media-flow connection between the monitored party and the second party;

means for copying the CC by the MRF; and means for routing a first copy of the CC from the MRF back to the media bearer node and for routing a second copy of the CC from the MRF to the Delivery Function;

wherein the Delivery Function includes means for establishing a SIP session between the Delivery Function and the LEMF for delivery of the CC.

7. The arrangement as recited in claim 6, wherein the SIP session provides a one-way connection for delivery of the CC to the LEMF.

8. The arrangement as recited in claim 6, further comprising a media gateway in the service domain for receiving the CC from the media bearer node and forwarding the CC to the MRF.

9. The arrangement as recited in claim 6, wherein:

the second communication means within the CSCF for sending the IRI toward the LEMF also sends IRI correlation information from the CSCF toward the LEMF; and the means for establishing a SIP session between the Delivery Function and the LEMF for delivery of the CC sends CC correlation information in a SIP header as a correlation number that is common for both IRI and CC.

10. The arrangement as recited in claim 9, further comprising means for correlating the IRI and the CC in the LEMF without any post processing.

* * * * *

UNITED STATES PATENT AND TRADEMARK OFFICE
CERTIFICATE OF CORRECTION

PATENT NO. : 7,843,902 B2  
APPLICATION NO. : 11/917917  
DATED : November 30, 2010  
INVENTOR(S) : Imbimbo et al.

Page 1 of 1

It is certified that error appears in the above-identified patent and that said Letters Patent is hereby corrected as shown below:

On the Title Page, in Field (73), under "Assignee", in Column 1, Line 1, delete "Relefonakticbolaget" and insert -- Telefonaktiebolaget --, therefor.

On the Title Page, in Field (73), under "Assignee", in Column 1, Line 2, before "Stockholm (SE)" insert -- (Publ), --, therefor.

On the Title Page, in Field (58), under "Field of Classification Search", in Column 1, Line 1, delete "None" and insert -- 370/352 --, therefor.

In Column 5, Line 53, delete "MEF" and insert -- MRF --, therefor.

In Column 6, Line 34, delete "capabilities" and insert -- capabilities. --, therefor.

Signed and Sealed this  
Sixteenth Day of August, 2011

David J. Kappos  
*Director of the United States Patent and Trademark Office*